US011083985B2

(12) United States Patent
Nellis (10) Patent No.: US 11,083,985 B2
(45) Date of Patent: Aug. 10, 2021

(54) VAPOR RELIEF STRAINER WITH CLEANER

(71) Applicant: Andritz Inc., Glens Falls, NY (US)

(72) Inventor: Walter E. Nellis, Queensbury, NY (US)

(73) Assignee: ANDRITZ INC., Alpharetta, GA (US)

( * ) Notice: Subject to any disclaimer, the term of this patent is extended or adjusted under 35 U.S.C. 154(b) by 301 days.

(21) Appl. No.: 15/874,141

(22) Filed: Jan. 18, 2018

(65) Prior Publication Data

US 2018/0207557 A1    Jul. 26, 2018

Related U.S. Application Data

(60) Provisional application No. 62/448,449, filed on Jan. 20, 2017.

(51) Int. Cl.
| | |
|---|---|
| *B01D 29/64* | (2006.01) |
| *D21C 11/06* | (2006.01) |
| *B01D 46/24* | (2006.01) |
| *B01D 46/00* | (2006.01) |
| *D21C 9/02* | (2006.01) |

(52) U.S. Cl.
CPC ......... *B01D 29/6476* (2013.01); *B01D 46/00* (2013.01); *B01D 46/0065* (2013.01); *B01D 46/2403* (2013.01); *D21C 9/02* (2013.01); *D21C 11/06* (2013.01); *D21C 11/066* (2013.01)

(58) Field of Classification Search
None
See application file for complete search history.

(56) References Cited

U.S. PATENT DOCUMENTS

| 3,333,700 | A | | 8/1967 | Coleman | |
|---|---|---|---|---|---|
| 3,379,312 | A | | 4/1968 | Brown | |
| 3,622,006 | A | * | 11/1971 | Brunner | B01D 35/02 210/355 |
| 5,183,568 | A | | 2/1993 | Lescovich | |
| 5,437,630 | A | | 8/1995 | Daniel | |
| 9,314,718 | B2 | * | 4/2016 | Mauda | B01D 29/68 |
| 9,475,098 | B2 | | 10/2016 | Grogan et al. | |
| 2006/0043014 | A1 | * | 3/2006 | Takatsuka | B01D 29/15 210/411 |
| 2009/0050582 | A1 | * | 2/2009 | Gil | B01D 29/114 210/798 |

(Continued)

FOREIGN PATENT DOCUMENTS

| KR | 10-0768080 | 10/2007 | |
|---|---|---|---|
| KR | 10-2012-0128448 | 11/2012 | |
| WO | WO-2005097289 A1 * | 10/2005 | ........... B01D 29/114 |

OTHER PUBLICATIONS

Campbell, Natasha N., U.S. office action for U.S. Appl. No. 13/911,145, dated Jun. 10, 2016, USPTO, USA.

*Primary Examiner* — Jonathan M Peo
(74) *Attorney, Agent, or Firm* — Kilpatrick Townsend & Stockton LLP (57) ABSTRACT

A vapor relief strainer cleaning assembly comprises a turbine and dislodger assembly, wherein the turbine is configured to move a dislodger assembly disposed within a vapor screen relief vessel. Exemplary dislodger assemblies are configured to be powered by vapor or gas and to use excess vapor or gas optionally to dislodge non-condensable contaminants from the filter screen or to facilitate contaminant dislodgement from the inner wall of the filter screen.

14 Claims, 7 Drawing Sheets

(56) References Cited

U.S. PATENT DOCUMENTS

2012/0074074 A1* 3/2012 Lean .................. B01D 29/6476
　　　　　　　　　　　　　　　　　　210/798
2013/0026111 A1* 1/2013 Gil ....................... B01D 29/114
　　　　　　　　　　　　　　　　　　210/791
2017/0050128 A1* 2/2017 Amaravadi ............ B01D 29/66

* cited by examiner

(Prior Art)

VAPOR RELIEF STRAINER WITH CLEANER

CROSS-RELATED APPLICATION

This application is a non-provisional utility application that claims the benefit under 35 U.S.C. § 119(e) of U.S. Provisional Patent Application No. 62/448,449 filed on Jan. 20, 2017, the entirety of which is incorporated herein by reference.

BACKGROUND OF THE INVENTION

1. Technical Field

The present disclosure relates generally to vapor cleaning in industrial processes and more particularly to vapor relief strainers configured to filter impurities from vapor exposed to fibers, fines, and other non-condensable contaminants borne from processing lignocellulosic material.

2. Related Art

Several chemical, mechanical, and biological engineering processes, including the production of pulp and paper from lignocellulosic material, utilize steam vapor to facilitate production. For example in chemical pulping, operators may introduce steam into the chip bin to displace entrapped air in the lignocellulosic material. A steaming vessel then preheats the lignocellulosic material to complete air displacement. The practice of displacing entrapped air increases the bulk density of the lignocellulosic material sent to the chemical digester, thereby increasing production efficiency.

In mechanical pulping, operators feed steam and lignocellulosic material through one or more mechanical refiners to develop and separate pulp fibers. In cellulosic biochemical production (e.g. the production of biofuels, bioplastics, and other products), operators may use steam explosion to increase the surface area of lignocellulosic material quickly for enzymatic, biological, or chemical hydrolysis.

The steam that passes through the lignocellulosic material and pulp tends to collect fibers, fines, and other lightweight impurities that are not easily condensable. These contaminants can be abrasive and can contribute to premature system wear if improperly filtered. Furthermore, unfiltered contaminants can occlude system conduits. Partially occluded conduits effectively narrow the conduit diameter, which can reduce yield per unit of energy expended. Stated differently, partially occluded conduits can increase the amount of input energy needed to maintain production levels.

To avoid this problem, operators generally route process steam through one or more vapor relief strainers disposed throughout the production system. A vapor relief strainer may comprise a filter screen disposed within a chamber defined by a vessel housing. The vapor relief strainer generally entraps contaminants as the steam flows through the filter screen. Cleaned steam then flows out of the vapor relief strainer for continued use in the process.

Over time, contaminants occlude the filter screen and disrupt the screening process. To clean the filter screen, operators may close the outlet valve and blow steam through one or more blowback nozzles in the filter housing at high pressure. In this manner, operators "blow back" steam through the filter and into the chamber to dislodge contaminants. Because operators close the outlet valve, the operators increase the pressure within the vapor relief strainer. The steam flowing upstream through the filter screen generally has a greater pressure than the pressure of the contaminated steam flowing downstream. As a result, the blowback method subjects the vapor relief strainer to pressures that exceed the vapor relief strainer's nominal operating capacity. Therefore, to reduce the probability of conduit or vessel rupture, operators tend to use the blowback method sparingly.

Furthermore, the blowback method tends to have limited effectiveness in cleaning the filter screen. The filter screen tends to have a greater surface area than the area exposed to the blowback steam. The blowback steam typically enters the filter chamber through a conduit that typically functions as an outlet during normal operation. The blowback steam may expand generally conically from the blowback conduit; however, the area of the filter screen that the blowback steam encounters may be less than the total surface area of the filter screen. Contaminants tend to be wet and clumped together on the filter screen. As a result, the blowback method ineffectively cleans the total surface area of the filter screen. That is, the blowback method typically creates localized contaminant-free areas on the filter screen that are located close to the blowback conduit along the path of the blowback steam.

Furthermore, a typical vapor relief strainer is generally not designed to be subjected to the blowback cleaning method for prolonged periods. The accumulated pressure increases the risk for a fatigue related failure of one or more components in the system. Therefore, arranging multiple blowback valves along the filter screen to dislodge contaminants would further increase the risk of system failure.

As a result, vapor relief strainers generally do not have blowback conduits sufficient to clear the filter screen's total surface area. Because the blowback method only cleans a portion of the filter screen, the blowback method effectively reduces the area of the filter screen capable of filtering out new contaminants. The reduced surface area decreases the amount of time the contaminants take to re-occlude the functional filter screen area, thereby encouraging more frequent use of the blowback method. The more frequently the blowback method is used, the greater the risk that the vapor relief strainer basket will fail.

To attempt to address this problem, a cleaning brush as more fully described in U.S. Pat. No. 9,475,098, (the entirety of which is incorporated herein by reference) was developed. The conventional cleaning brush described engages a column. The column and brush likewise extend through the vapor relief strainer and move axially via a transpositive piston assembly disposed on a support housing. However, the cleaning brush apparatus effectively tripled the height of the vapor relief strainer assembly. Available space in mills can be limited. Equipment or support structures proximate to an existing vapor relief strainer impinge a brush apparatus's availability as an effective cleaning solution. The brushing solution also requires an external power source, thereby increasing the energy demand associated with production.

SUMMARY OF THE INVENTION

The problem of contaminant accumulation in a vapor relief vessel is mitigated by a vapor relief strainer cleaning assembly comprising: a dislodger assembly comprising: a shaft having a first axial end distally disposed from a second axial end, a dislodger support extending outwardly from the shaft, wherein the dislodger support engages a dislodger, a discharge support extending outwardly from the shaft, wherein the discharge support engages a discharge arm, the discharge arm having areas defining multiple exhaust openings along a length of the discharge arm, and a lid assembly comprising: a turbine housing having walls, wherein the walls of the turbine housing define a turbine chamber, a turbine vapor inlet, a first turbine vapor outlet, and a second turbine vapor outlet, wherein the turbine chamber fluidly communicates with the turbine vapor inlet, the first turbine vapor outlet, and the second turbine vapor outlet, wherein the second turbine vapor outlet is configured to fluidly communicate with the multiple exhaust openings in the discharge arm; a turbine comprising paddles extending outwardly from a turbine hub, wherein the first axial end of the shaft is configured to engage the turbine hub around a center of rotation, and wherein the turbine is configured to be disposed in the turbine housing.

The present disclosure describes a vapor relief strainer cleaning assembly comprising a turbine configured to power a dislodger assembly. Exemplary vapor relief strainer cleaning assemblies may use an existing vapor source (e.g. a power boiler) to power the vapor relief strainer cleaning assembly. Operators may collect and reuse the vapor used to power the relief strainer cleaning assembly elsewhere in the process, thereby reducing the impact of the exemplary vapor relief strainer cleaning assembly as a net energy consumer in the production system. In addition, a portion of the excess vapor used to power the vapor relief strainer cleaning assembly may be used as a dislodging means, thereby avoiding the need for physical contact between the dislodger and the inner wall of the filter screen in certain exemplary embodiments, thereby mitigating filter screen fatigue and wear.

Furthermore, the use of vapor from a pre-existing source and the ability to collect said vapor after the vapor has been used to power a turbine may allow operators to clean vapor relief strainers more regularly than would otherwise be feasible with the blowback method.

Additionally, the compact size of the exemplary vapor relief strainer cleaning assemblies described herein may allow operators to retrofit existing vapor relief strainers with embodiments in accordance with this disclosure, including in instances where equipment crowds or surrounds an existing vapor relief strainer.

It is contemplated that the exemplary embodiments disclosed herein may eliminate the need for blowback conduits and blowback cleaning methods.

BRIEF DESCRIPTION OF THE DRAWINGS

The foregoing will be apparent from the following more particular description of exemplary embodiments of the disclosure, as illustrated in the accompanying drawings in which like reference characters refer to the same parts throughout the different views. The drawings are not necessarily to scale, with emphasis instead being placed upon illustrating the disclosed embodiments.

DETAILED DESCRIPTION OF THE INVENTION

The following detailed description of the preferred embodiments is presented only for illustrative and descriptive purposes and is not intended to be exhaustive or to limit the scope and spirit of the invention. The embodiments were selected and described to best explain the principles of the invention and its practical application. One of ordinary skill in the art will recognize that many variations can be made to the invention disclosed in this specification without departing from the scope and spirit of the invention.

Corresponding reference characters indicate corresponding parts throughout the several views. Although the drawings represent embodiments of various features and components according to the present disclosure, the drawings are not necessarily to scale and certain features may be exaggerated in order to better illustrate embodiments of the present disclosure, and such exemplifications are not to be construed as limiting the scope of the present disclosure in any manner.

References in the specification to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Although specific terms are used in the following description for the sake of clarity, these terms are intended to refer only to the particular structure of the embodiment selected for illustration in the drawings, and are not intended to define or limit the scope of the disclosure.

The singular forms "a," "an," and "the" include plural referents unless the context clearly dictates otherwise. Numerical values should be understood to include numerical values that are the same when reduced to the same number of significant figures and numerical values that differ from the stated value by less than the experimental error of conventional measurement technique of the type described in the present application to determine the value.

All ranges disclosed herein are inclusive of the recited endpoint and are independently combinable.

As used herein, approximating language may be applied to modify any quantitative representation that may vary without resulting in a change in the basic function to which it is related. Accordingly, a value modified by a term or terms, such as "about" and "substantially," may not be limited to the precise values specified. The modifier "about" should also be considered as disclosing the range defined by the absolute values of the two endpoints. For example, the expression "from about 2 to about 4" also discloses the range "from 2 to 4."

It should be noted that many of the terms used herein are relative terms. For example, the terms "upper" and "lower" are relative to each other in location, i.e. an upper component is located at a higher elevation than a lower component in a given orientation, but these terms can change if the device is flipped. The terms "inlet' and "outlet" are relative to a fluid flowing through them with respect to a given structure, e.g. a fluid flows through the inlet into the structure and flows through the outlet out of the structure. The terms "upstream" and "downstream" are relative to the direction in which a fluid flows through various components, i.e. the flow of fluids through an upstream component prior to flowing through the downstream component.

The terms "horizontal" and "vertical" are used to indicate direction relative to an absolute reference, i.e. ground level. However, these terms should not be construed to require structure to be absolutely parallel or absolutely perpendicular to each other. For example, a first vertical structure and a second vertical structure are not necessarily parallel to each other. The terms "top" and "bottom" or "base" are used to refer to locations/surfaces where the top is always higher than the bottom/base relative to an absolute reference, i.e. the surface of the Earth. The terms "upwards" and "downwards" are also relative to an absolute reference; an upwards flow is always against the gravity of the Earth.

Figure 5:
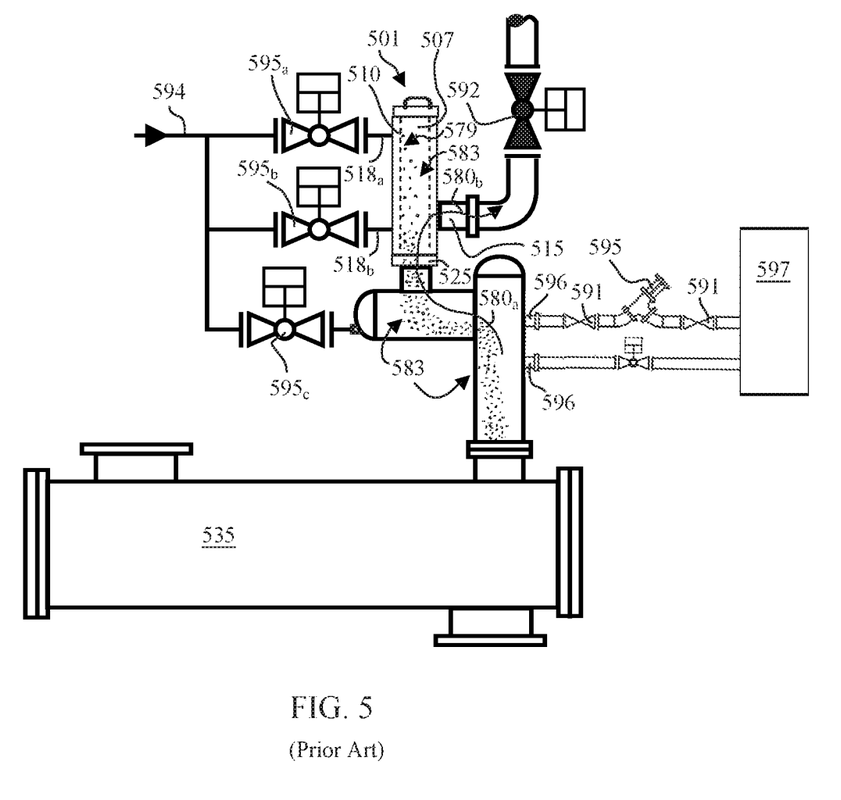
FIG. 5 is a schematic diagram of a vapor relief strainer affixed to a steaming vessel.

FIG. 5 is a schematic diagram of a conventional steaming vessel and a conventional vapor relief strainer 501 disposed on a steaming vessel 535. During normal operation, contaminated vapor $580_a$ flows from the steaming vessel 535 into a vapor relief strainer 501 comprising a filter screen 510. The "filter screen" 510 is sometimes known as a "filter screen basket" by those having ordinary skill in the art. Non-condensable contaminants 583 such as fines, fibers, and other non-condensables flow with the contaminated vapor $580_a$ into the inlet 525 and chamber 507 of the vapor relief strainer 501 and eventually accumulate on the inner wall 579 of the filter screen 510. The vapor 580 that passes through the filter screen 510 is referred to as "cleaned vapor" $580_b$. Over time, the accumulated non-condensable contaminants 583 occlude the filter screen 510, thereby reducing the filtering efficacy and increasing the energy expended to produce the same volume of cleaned vapor $580_b$.

To address this problem, operators previously used the "blowback method" to attempt to clean the filter screen 510. In the blowback method, operators close the outlet valve 592 disposed downstream of the outlet conduit 515. The contaminated vapor $580_a$ still flows into the vapor relief strainer 501, thereby allowing the pressure to increase. If the pressure inside the system becomes too great, the contaminated vapor $580_a$ flows through one or more relief conduits 596 disposed downstream of the vapor relief strainer 501. This contaminated vapor $580_a$ may flow through one or more locked open valves 591 disposed along the relief conduits 596. A rupture pin 595 may be disposed in one or more of the relief conduits 596. If the pressure in the relief conduit 596 exceeds the calibrated resistance of the rupture pin 595, the rupture pin 595 will open, thereby allowing the contaminated vapor $580_a$ to flow downstream to a vent to a relief standpipe 597. Even with the relief conduits 596 and rupture pin 595, repeated pressure accumulations increase the risk for a fatigue-related failure of one or more components in the system.

After closing the outlet valve 592, operators pump blowback vapor 594 through blowback conduits $518_a$, $518_b$. Further blowback conduits $518_c$ may be disposed downstream of the vapor relief strainer 501. Blowback vapor 594 may come from a vapor source, such as a power boiler (not depicted). When the blowback vapor 594 enters the filter chamber 510, the blowback vapor 594 may expand generally conically from the blowback conduits $518_a$, $518_b$; however, the area of the filter screen 510 that the blowback vapor 594 encounters may be less than the total surface area of the filter screen 510. As a result, the blowback method ineffectively cleans the total surface area of the filter screen 510.

Therefore, the conventional blowback method increases the risk of system failure and tends to clear only the portions of the filter screen 510 aligned with an adjacent blowback conduit $518_a$, $518_b$. To address these problems, Applicant discloses exemplary vapor relief strainer cleaning assemblies 100, 200 comprising dislodger assemblies (see 120, 220, 620, 720) and a turbine (see 165, 265, 365) as more fully described herein.

Figure 1:
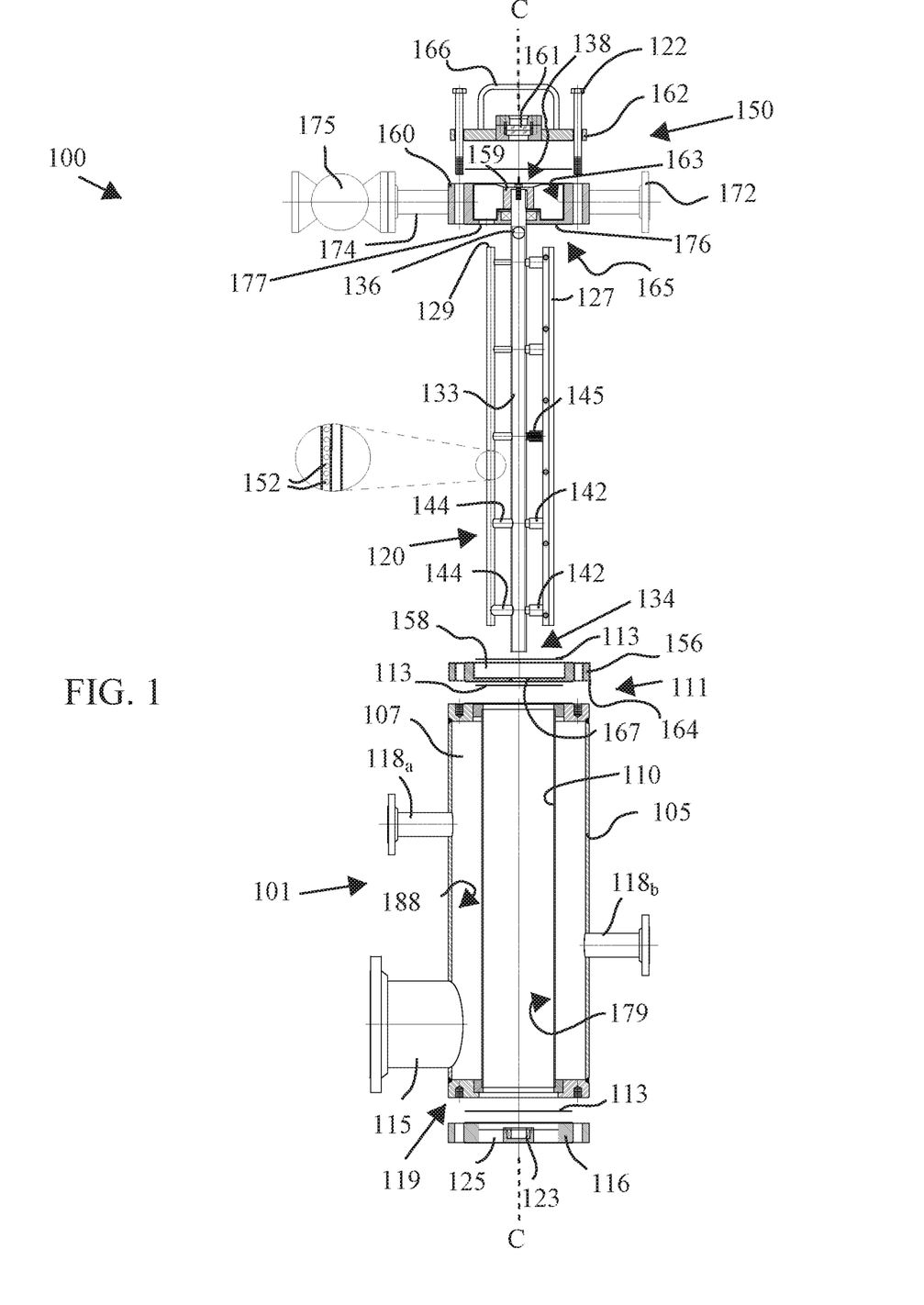
FIG. 1 is a cross-sectional exploded view of vapor relief strainer and exemplary vapor relief strainer cleaning assembly.

FIG. 1 is an exploded view of an exemplary vapor relief strainer cleaning assembly 100 comprising a turbine 165 and a dislodger assembly 120. A vapor relief strainer cleaning assembly 100 may be used with processes that benefit from the re-use of cleaned vapor. For example, in chemical pulping, steaming vessels, chip bins, and other process vessels may fluidly communicate with a vapor relief strainer 101. In practice, vapor relief strainers 101 tend to have a cylindrical shape, but this disclosure does not prevent an exemplary vapor relief strainer cleaning assembly 100 from having from being or generally resembling another shape.

The vapor relief strainer 101 comprises a housing 105 having an inner wall 188 defining a chamber 107. A filter screen 110 may be disposed within the chamber 107. The filter screen 110 is porous and configured to entrap non-condensable contaminants 583, FIG. 5) such as fibers, fines, and other non-condensables in the contaminated vapor ($280_a$, FIG. 2) by having holes that are too small for the non-condensable contaminants 583 to pass through. The housing 105 may further comprise an outlet conduit 115 and one or more blowback conduits $118_a$, $118_b$. Fasteners (see 122) may extend through a flange (not pictured) to engage a spacer 116 to a first end 119 of the housing 105. A seal 113, such as a washer plate or other seal configured to contain pressure within the chamber 107 at a juncture of two or more non-fused parts may be disposed at the first end 119 of the housing 105. In other exemplary embodiments, the seal 113 may be disposed in the spacer 116.

The spacer 116 may have areas defining a vapor inlet 125. It will be appreciated that the spacer 116 may be absent and the housing 105 may have areas defining the vapor inlet 125 in other exemplary embodiments. The spacer 116 may further comprise a bearing 123 configured to receive a second axial end 134 of the shaft 133. In the depicted embodiment, the dislodger assembly 120 is a rotary dislodger assembly 120. However, this disclosure should not be construed to limit the dislodger assembly 120 to being a rotary dislodger assembly. In other exemplary embodiments, the dislodger assembly 120 may dislodge non-condensable contaminants 583 from the filter screen 110 axially, diagonally, helically, with no pre-defined path, or a combination thereof. Exemplary dislodger assemblies 120 may be characterized by being configured to be powered by vapor or gas (see $290_a$, FIG. 2) and optionally use excess vapor or gas (see $290_c$, FIG. 2) to dislodge non-condensable contaminants 583 from the filter screen 110 or to facilitate the dislodging of contaminants 583 from the filter screen 110.

In the depicted embodiment, the dislodger assembly 120 comprises a dislodger 127. The dislodger 127 extends substantially the entire length of the filter screen 110. In other exemplary embodiments, the dislodger 127 may comprise multiple dislodgers 127 disposed along a length of the filter screen 110. Dislodger supports 142 extend outwardly from a shaft 133 to support the dislodger 127. The shaft 133 is elongate and extends through the chamber 107. In the depicted embodiment, the shaft 133 is hollow and comprises areas defining a shaft inlet 136, preferably near the first axial end 138 of the shaft 133. Each dislodger support 142 engages a spring 145. Each spring 145 applies elastic force to the corresponding dislodger support 142 and to the dislodger 127 thereby pressing the dislodger 127 against the inner wall 179 of the filter screen 110. A dislodger 127 may include, by way of example, contact dislodgers such as a scraper, a brush, a rake, a sponge, a rag, a pipe cleaner, bristles, or other device configured to physically contact and dislodge contaminants 583 from the filter screen 110, non-contact dislodgers, such as the discharge arm 129 described herein, and other devices configured to use an intermediate medium (e.g. vapor, gas, other fluid, or fine particles) to dislodge contaminants 583 from the filter screen 110.

It will be understood that "spring" encompasses any device or devices configured to apply elastic force to the dislodger 127 and thereby press the dislodger 127 to the filter screen 110. In certain exemplary embodiments, not every dislodger support 142 may engage a spring 145. In still other exemplary embodiments, more than one spring 145 may engage a dislodger support 142. In still other exemplary embodiments, dislodger supports 142 may engage more than one dislodger 127 (see FIG. 3).

Discharge supports 144 extending outwardly from the shaft 133 support a discharge arm 129. The discharge supports 144 can be hollow and may fluidly communicate with a hollow shaft 133 and a hollow discharge arm 129. A discharge arm 129 may be hollow and comprise areas defining multiple exhaust openings 152 disposed along the length of the discharge arm 129. Other exemplary embodiments may comprise more than one discharge arm 129 (see FIG. 7). The shaft 133, discharge supports 144, and discharge arm 129 are hollow in the preferred embodiment. The hollow shaft 133, hollow discharge supports 144, and hollow discharge arm 129 convey a second portion of the turbine vapor ($290_c$, FIG. 2) from the turbine chamber 163 through the depicted dislodger assembly 120, out through the exhaust openings 152, and through the filter screen 110, thereby cleaning the filter screen 110. However, it is contemplated that in other exemplary embodiments, the shaft 133, discharge supports 144, and discharge arm 129 may not function as conduits themselves, but instead support one or more external conduits fluidly communicating with the turbine chamber 163 and the filter screen 110.

Combinations of a shaft 133, discharge support 144, or discharge arm 129 functioning as conduits and supporting external conduits are considered to be within the scope of this disclosure. The discharge arm 129 may physically contact the inner wall 179 of the filter screen 110 to facilitate non-condensable contaminant 583 dislodgment. In other exemplary embodiments, the discharge arm 129 may not physically contact the inner wall 179 of the filter screen 110 and rely on the second portion of the turbine vapor ($290_c$, FIG. 2) exiting the discharge arm 129 to dislodge non-condensable contaminants 583.

By way of example, the dislodger assembly 120 may be assembled from stainless steel or other material configured to endure the pressure and temperature of the chamber 107.

A lid assembly 150 may engage a second end 111 of the housing 105, which is distally disposed from the first end 119 of the housing 105. The lid assembly 150 may comprise a turbine housing 160 and a second chamber housing 156 configured to be disposed between the second end 111 of the housing 105 and the turbine housing 160. The second chamber housing 156 comprises a floor 164 and shaft seal 167 for the shaft 133. Fasteners 122 may engage a cap 162 to the turbine housing 160. The cap 162 may be disposed distally from the second chamber housing 156.

In other exemplary embodiments, the second chamber housing 156 may be omitted. In embodiments in which the second chamber housing 156 is omitted, the shaft 133 may be solid and the turbine (365, FIG. 3 and see FIG. 6) would provide the thrust to turn the shaft 133. In the depicted embodiment, the turbine 165 still provides thrust to turn the dislodger assembly 120, but the second portion of the turbine vapor ($290_c$, FIG. 2) exiting the discharge arm 129 (see FIG. 2) may provide supplemental thrust. In still other exemplary embodiments, the turbine housing 160, second chamber housing 156, and cap 160 may be a single continuous piece. The second chamber housing 156 may have an area defining a second chamber 158.

The turbine housing 160 has a wall ($260_a$, FIG. 2) defining a turbine chamber 163. A turbine hub 159 engages the first axial end 138 of the shaft 133 with a fastener 122 or other known structure. Paddles (370, FIG. 3) extend outwardly from the turbine hub 159. The turbine housing 160 further comprises a wall $260_a$ defining a turbine vapor inlet (271, FIG. 2). A turbine vapor inlet conduit 172 aligns with the turbine vapor inlet 271 and engages the wall $260_a$ of the turbine housing 160 to fluidly communicate with the turbine housing 160.

Figure 2:
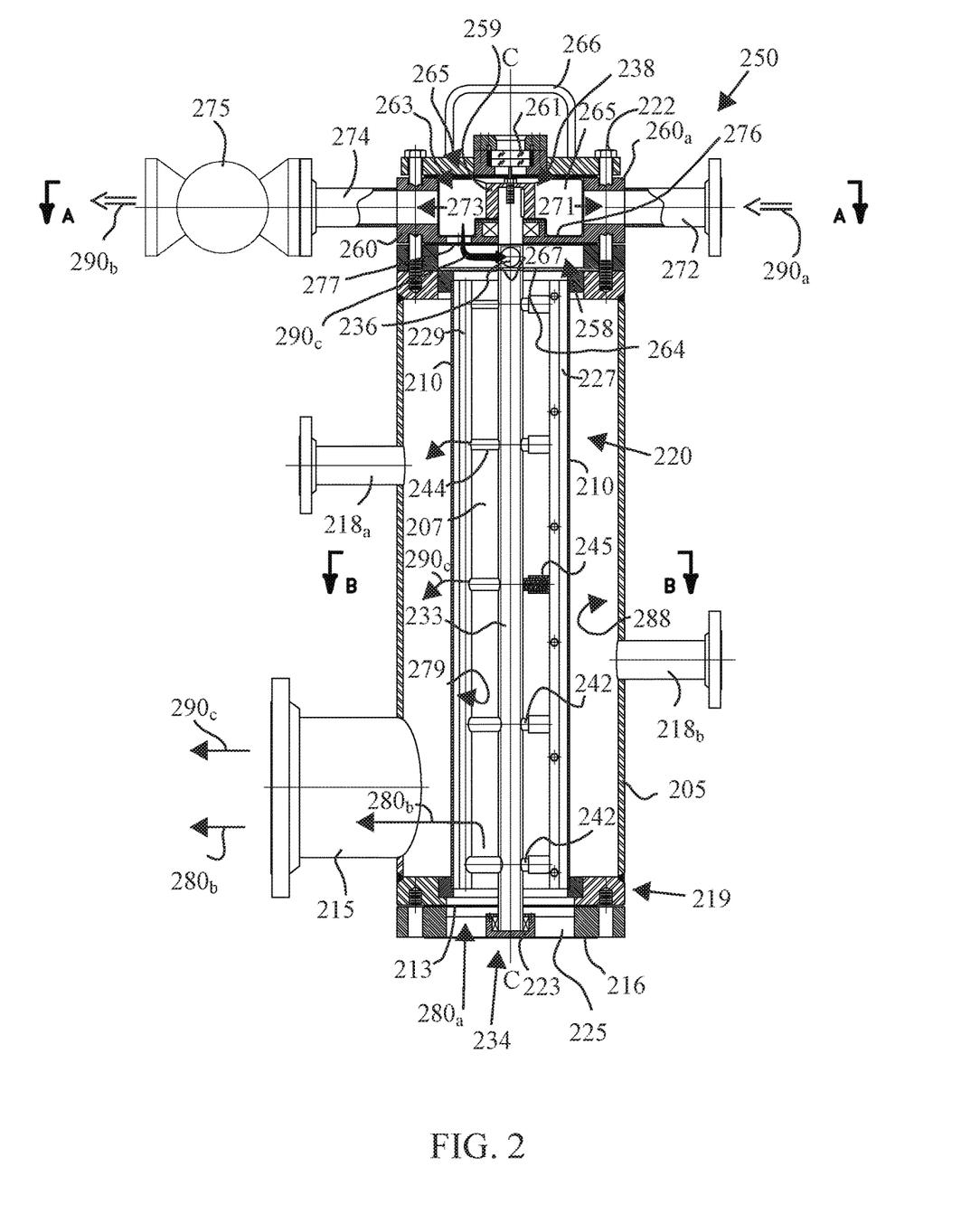
FIG. 2 is a cross-sectional view of the assembled vapor relief strainer cleaning assembly shown in FIG. 1.

The turbine housing 160 further comprises a wall $260_a$ defining a first turbine vapor outlet (273, FIG. 2). A turbine vapor outlet conduit 174 aligns with the first turbine vapor outlet 273 and engages the wall $260_a$ of the turbine housing 160 to fluidly communicate with the turbine housing 160. A throttling valve 175 may engage the turbine vapor outlet conduit 174. Operators may use the throttling valve 175 to regulate the flow of the first portion of turbine vapor ($290_b$, FIG. 2) exiting the turbine housing 160 through the first turbine vapor outlet 273. In FIG. 1 and FIG. 2, the turbine vapor outlet conduit 174 is disposed distally from the turbine vapor inlet conduit 172 to more clearly depict the profile of each conduit, however, the inlet conduit 172 and the outlet conduit 174 need not be distally oppositely disposed.

The exemplary dislodger assembly 120, lid assembly 150, and spacer 116 may be used to retrofit pre-existing vapor relief strainers 101. Accordingly, the turbine vapor outlet conduit 174 and turbine vapor inlet conduit 172 may be disposed on the turbine housing 160 to accommodate pre-existing space limitations or to optimize the length of vapor turbine conduit. (See FIGS. 3 and 4). The compact design of the exemplary vapor relief strainer cleaning assembly 100 comprising a turbine 165 and a dislodger assembly 120 further permits the vapor relief strainer cleaning assembly 100 to be used with existing vapor relief strainers 101.

The turbine housing 160 further comprises a floor 176. The floor 176 has areas defining a second turbine vapor outlet 177. The second vapor outlet 177 permits the turbine chamber 163 to fluidly communicate with the second chamber housing 156 and the second chamber 158 disposed between the turbine chamber 163 and the housing 105.

The cap 162 may comprise a sight glass 161. The sight glass 161 permits operators to see the turbine 165 when the vapor relief strainer cleaning assembly 100 is sealed. The cap 162 may further comprise a handle 166 to facilitate the cap's removal from the vapor relief strainer cleaning assembly 100 during maintenance periods. In the depicted embodiment, fasteners 122 engage the cap 162, turbine housing 160, and second chamber housing 156 to the second end 111 of the housing 105. It will be understood that the lid assembly 150 may engage the housing 105 in a variety of ways appreciated by those skilled in the art. Each such way is considered to be within the scope of this disclosure.

FIG. 2 depicts the same cross-sectional view of an exemplary vapor relief strainer cleaning assembly 200 as in FIG. 1, except that the components are assembled as they might be seen in operation. In operation, contaminated vapor $280_a$ from a process enters a vapor inlet 225. The contaminated vapor $280_a$ flows into the chamber 207 and through the filter screen 210. In this manner, the contaminated vapor $280_a$ may pressurize the chamber 207 to between about 15 pounds per square inch ("psi") to about 18 psi and may heat the chamber 207 to between about 200 degrees Fahrenheit ("° F.") to about 260° F. As the contaminated vapor $280_a$, passes through the porous surface of the filter screen 210, the filter screen 210 collects contaminants 583 (FIG. 5) on the inner wall 279 of the filter screen 210, thereby preventing the contaminants 583 from exiting the vapor relief strainer 201 through the outlet conduit 215. Ideally, the cleaned vapor $280_b$ exits the vapor relief strainer 201 through the outlet conduit 215. Over time, the contaminants 583 accumulate on the filter screen's inner wall 279 and occlude the filter screen's pours, thereby increasing the pressure and energy required to clean the contaminated vapor $280_a$. Conventionally, operators would occasionally use blowback conduits $218_a$, and $218_b$ to attempt to clean the filter screen 210, but the blowback method generally cleans only a small portion of the filter screen 210 near each blowback conduit $218_a$, and $218_b$.

To address this problem, the present disclosure teaches that turbine vapor $290_a$ may be pumped through the turbine vapor inlet conduit 272 and turbine vapor inlet 271 into the turbine chamber 263. The turbine vapor 290 rotates the paddles 370 (FIG. 3), which likewise rotate the turbine hub 259 and the dislodger assembly 220. In this manner, the first axial end 238 of the shaft 233 may be or may engage the turbine hub 259 around a center of rotation C. The moving dislodger 227 thereby dislodges non-condensable contaminants 583 from substantially the entire length of the filter screen 210. The non-condensable contaminants 583 may then fall downward into the process. For example, if the vapor relief strainer 201 were affixed to a steaming vessel 535 the contaminants would fall back into the steaming vessel 535.

After exerting a pressing force on the paddles 370, a first portion of turbine vapor $290_b$ may exit the turbine chamber 263 through the first turbine vapor outlet 273 and turbine vapor outlet conduit 274 or through the second turbine vapor outlet 277. Operators may use the throttling valve 275 to regulate the rate at which the first portion of the turbine vapor $290_b$ exits the turbine housing 260 and thereby regulate the rate at which the dislodger assembly 220 rotates. A second portion of turbine vapor 290 that does not exit through the throttling valve 275 may exit the turbine chamber 263 through the second turbine vapor outlet 277. The second portion of the turbine vapor 290 enters the shaft inlet 236. Upon entering the shaft inlet 236, the second portion of the turbine vapor 290 flows through the shaft 233 and downstream through the discharge supports 244 and into the discharge arm 229. The second portion of the turbine vapor 290 then exits the dislodger assembly 220 through the multiple exhaust openings 152 disposed along the discharge arm 229, thereby further dislodging and cleaning out any fines or other non-condensable contaminants 583 that may have become lodged within the openings of the filter screen 210.

The discharge supports 244 disposed further from the turbine housing 260 may have a greater width than discharge ports 244 disposed nearer to the turbine housing 260. The increasing intervals may permit uniform flow of turbine vapor 290 into the discharge arm 229 as the turbine vapor 290 loses pressure.

The second portion of the turbine vapor $290_c$ is also cleaned upon passing through the filter screen 210 and may exit the vapor relief strainer 201 through the outlet conduit 215. For this reason, the turbine vapor 290 may comprise contaminated vapor $280_a$ in certain exemplary embodiments. In other exemplary embodiments, the turbine vapor 290 may be substantially clean. It is preferred to use clean vapor, however, because using contaminated vapor will likely clog the system over time.

One feature of the exemplary embodiments comprising discharge arm 229 is that the second portion of the turbine vapor $290_c$ passes through the filter screen 210 and may carry or force through an amount of non-condensable contaminates 583 through the filter screen 210. However, when used in conjunction with a dislodger 227, the dislodger assembly 220 may clean the inner wall 279 of the filter screen 210 while pushing some contaminants through the filter screen 210 thereby causing the non-condensable contaminants 583 lodged in the filter screen 210 to improve the filtering qualities of the vapor relief strainer 200, while preventing excessive accumulation of non-condensable contaminants 583 on the inner wall 279 of the filter screen 210. In this manner, exemplary vapor relief strainer cleaning assemblies 200 may maintain optimal filtration conditions and avoid an excessive accumulation of non-condensable contaminants 583 on the inner wall 279 of the filter screen 210 that would otherwise render the vapor relief strainer 201 less functional or non-functional.

To assist in the movement of a portion of the non-condensable contaminants 583 through the filter screen 210, the filter screen holes may have curved inlets on the inner wall 279 of the filter screen 210 such as the curved inlets described in U.S. Pat. No. 7,799,173, the entirety of which is incorporated herein by reference.

Figure 3:
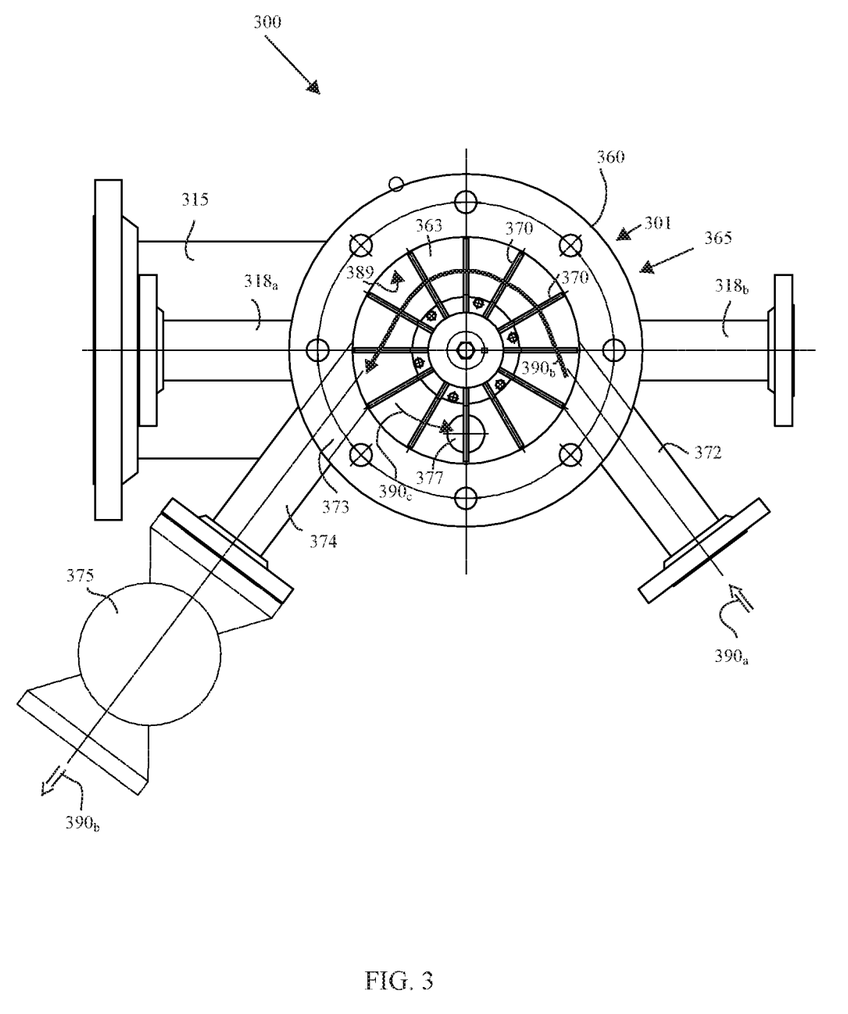
FIG. 3 is a top down cross-sectional view of the vapor relief strainer cleaning assembly highlighting a turbine taken along line A-A in FIG. 2 looking down toward the first end of a vapor relief strainer housing.

FIG. 3 is a top-down view of an exemplary vapor relief strainer 300. Turbine vapor $390_a$ may enter the turbine vapor inlet conduit 372 and thereby enter the turbine chamber 363. The incoming turbine vapor 390 presses on the paddles 370 and thereby rotates the turbine 365. The turbine vapor inlet conduit 372 is desirably disposed at angle relative to the inner sidewall 389 of the turbine housing 360. This angle facilitates turbine 365 rotation.

The turbine vapor outlet conduit 374 may also be disposed at an angle relative to the inner sidewall 389 of the turbine housing 360. FIG. 3 more clearly depicts a first portion of the turbine vapor $390_b$ exiting the turbine chamber 363 through the first turbine vapor outlet 373 and turbine vapor outlet conduit 374. A second portion of the turbine vapor $390_c$ exits the turbine chamber 363 through the second turbine vapor outlet 377.

Figure 4:
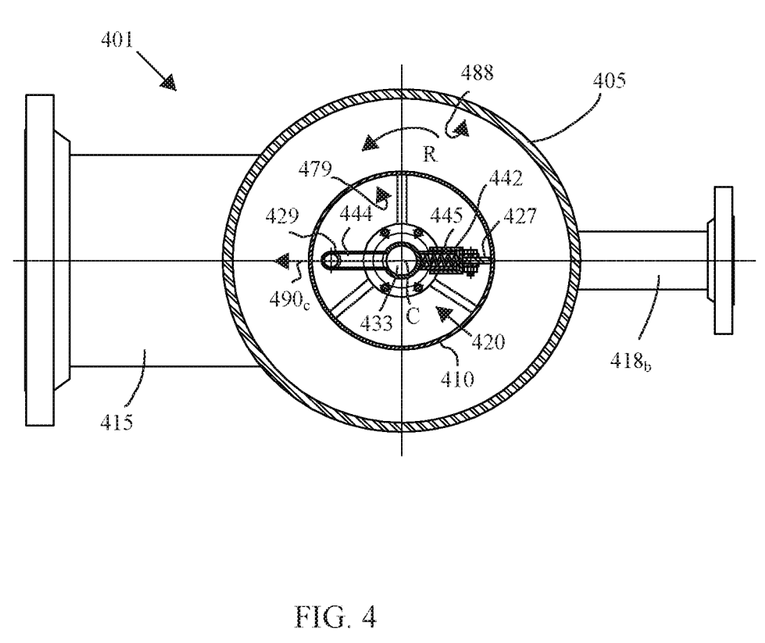
FIG. 4 is a top down cross-sectional view of the vapor relief strainer cleaning assembly taken along line B-B in FIG. 2 looking down toward the first end of the vapor relief strainer housing.

The turbine vapor $390_a$ may come from an existing source (e.g. typically a power boiler), thereby obviating the need for an additional power source. Using turbine vapor $390_a$ from an existing source may eliminate or significantly reduce the need for additional energy to clean the vapor relief strainer 401 (FIG. 4). Because the vapor required to rotate the turbine 365 is minimal compared to the needs of a mill (e.g. a pulp mill), and because operators can collect and reuse the clean first portion of the turbine vapor 390$_b$ from the turbine vapor outlet conduit 374, the exemplary vapor relief strainer cleaning assemblies 300 disclosed herein may be run constantly if desired, thereby maintaining or improving the original efficiency of a vapor relief strainer 301 over greater periods of time than were previously possible using conventional methods.

FIG. 4 is a cross-sectional view of the vapor relief strainer cleaning assembly 100 comprising a turbine 365 (shown in FIG. 3) and a dislodger assembly 420. FIG. 4 is taken along line B-B in FIG. 2 looking down toward the first end 219 of the vapor relief strainer housing 405. The second portion of the turbine vapor 490$_c$ flows down through the shaft 433 and outwardly through discharge supports 444 and discharge arm 429. As the second portion of the turbine vapor 490$_c$ exits the discharge arm 429 and flows through the filter screen 410, the second portion of the turbine vapor 490$_c$ may facilitate the cleaning of the inner wall 479 of the filter screen 410.

If the turbine vapor 390$_a$ flows as depicted in FIG. 3, the dislodger assembly 420 will rotate around the center of rotation C in a counter clockwise direction R. It will be understood that the exemplary vapor relief strainer cleaning assembly (see 100, 200; FIG. 1 and FIG. 2) may be configured to rotate in either direction. As the dislodger assembly 420 rotates, springs 445 disposed in a dislodger support 442 press the dislodger 427 against the inner wall 479 of the filter screen 420. The movement of the dislodger 427 against the filter screen 410 dislodges accumulated non-condensable contaminants 583 and thereby cleans the filter screen 410 using turbine vapor 390 (FIG. 3). A blowback conduit 418$_b$ and an outlet conduit 415 are depicted for reference.

Figure 6:
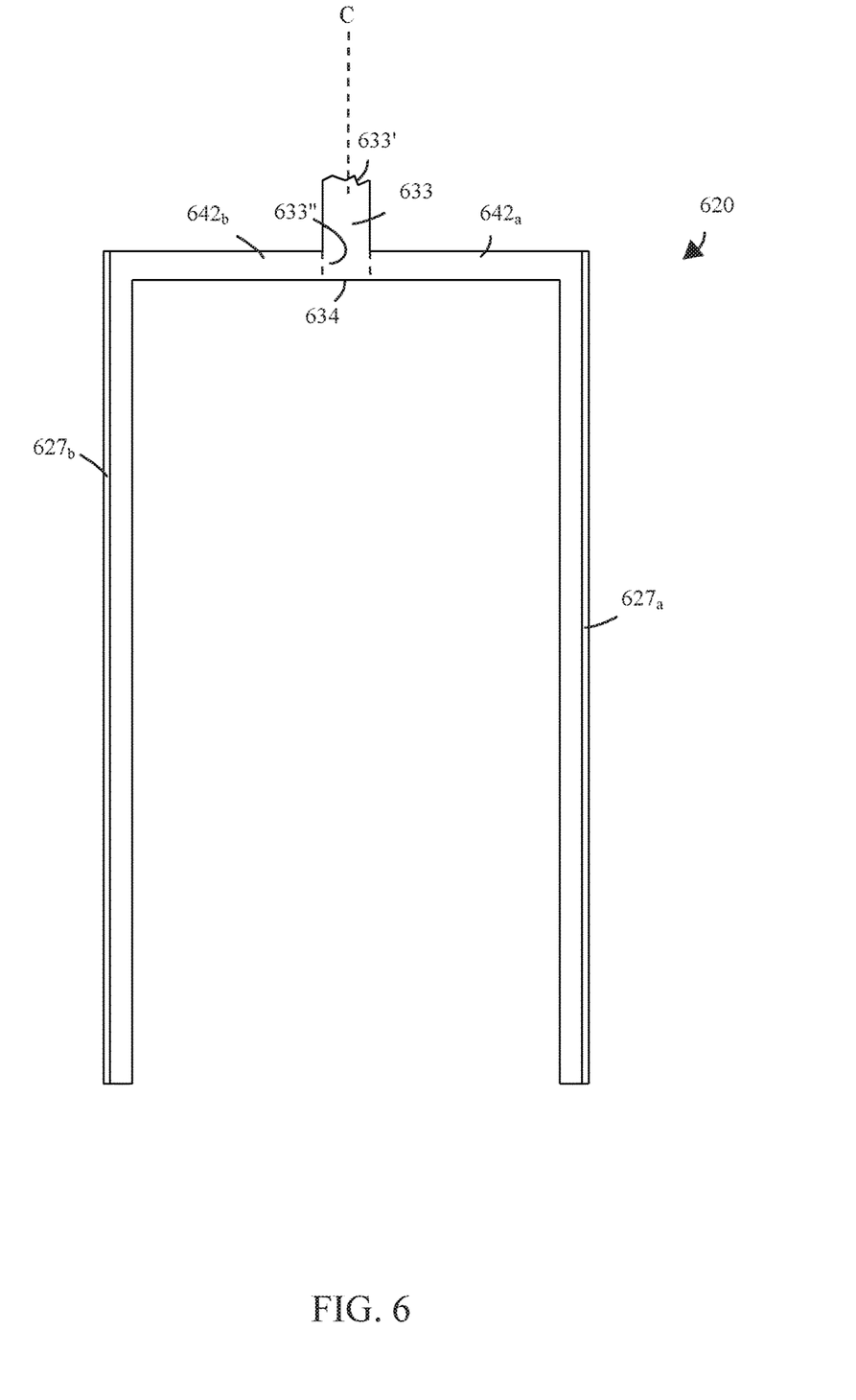
FIG. 6 is a schematic representation of an alternative embodiment of the vapor relief strainer cleaning assembly comprising a stub shaft and multiple dislodgers.

FIG. 6 is a schematic representation of an alternative embodiment of a dislodger assembly 620 of an exemplary vapor relief strainer cleaning assembly 200. In FIG. 6, the dislodger assembly 620 comprises multiple dislodgers 627$_a$, 627$_b$. The shaft 633 is a solid stub shaft 633 that does not extend through the length of the chamber 107; rather, the first portion of the shaft 633' extending into the turbine chamber 363 and terminating in a first axial end 238 (see FIG. 2) comprises the turbine hub 259 and the distal portion of the shaft 633" terminating in a second axial end 634 and engages distally disposed dislodger supports 642$_a$, 642$_b$. Each dislodger support 642$_a$, 642$_b$ engages a respective dislodger 627$_a$, 627$_b$. The turbine 365 and turbine vapor 390 rotate the exemplary dislodger assembly 620 having multiple dislodgers 627$_a$, 627$_b$ to clean the inner wall 279 of the filter screen 210. In other exemplary embodiments, the dislodgers 627$_a$, 627$_b$ may be non-contact dislodgers such as a discharge arm 729, or other devices configured to use an intermediate medium (e.g. vapor, gas, other fluid, or fine particles) to dislodge contaminants 583 from the filter screen 210 assembly.

Figure 7:
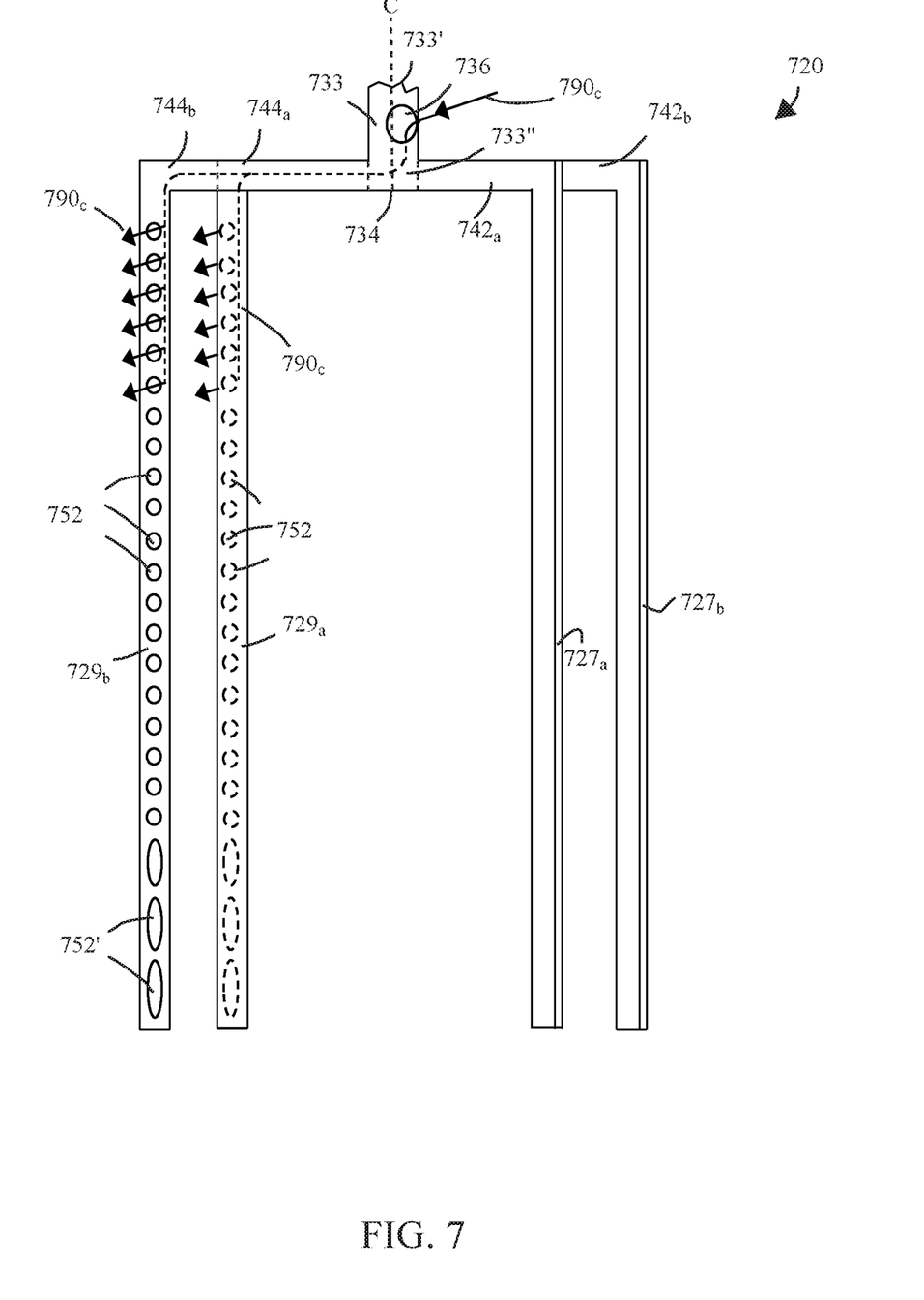
FIG. 7 is a schematic representation of an alternative embodiment of a vapor relief strainer cleaning assembly comprising a hollow stub shaft, hollow discharge supports, multiple hollow discharge arms, and multiple dislodgers.

FIG. 7 is a schematic representation of an alternative embodiment of a dislodger assembly 720 of a vapor relief strainer cleaning assembly 200. In the depicted embodiment, the dislodger assembly 720 comprises a hollow stub shaft 733, multiple hollow discharge arms 729$_a$, 729$_b$ and a hollow discharge support 744$_a$, 744$_b$ engaging a respective hollow discharge arm 729$_a$, 729$_b$, wherein the dislodger assembly 720 comprises multiple dislodgers 727$_a$, 727$_b$. Each dislodger support 742$_a$, 742$_b$ engages a respective dislodger 727$_a$, 727$_b$. The depicted embodiment operates as disclosed with reference to FIGS. 1 and 2. The turbine 365 and turbine vapor 390 provide the motive force to rotate the exemplary dislodger assembly 720 to clean the inner wall 279 of the filter screen 210. Furthermore, the second portion of the turbine vapor 790$_c$ may provide additional motive force to the dislodger assembly 720 and may further dislodge contaminants that have accumulated on the inner wall 279 of the filter screen 210. As represented in FIG. 7, the multiple exhaust openings 752 in a discharge arm 729 may become wider or more elongate (or both wider and more elongate) as the exhaust openings 752' are disposed further from the turbine 365. Larger exhaust openings 752' disposed further from the turbine 365 may permit the second portion of the turbine vapor 790$_c$ exiting the exhaust openings 752' to pass through the filter screen 210 at a substantially uniform rate and pressure and thereby facilitate dislodging contaminants and cleaning the inner wall 279 of the filter screen 210 evenly along the length of the filter screen 210. It will be appreciated that although multiple exhaust openings 752, 752' are considered to comprise the preferred embodiment, a single exhaust opening 752, 752' in a discharge arm 729 is considered to be within the scope of this disclosure. The exhaust openings 752, 752' may face the inner wall 279 of the filter screen 210. In other exemplary embodiments, the exhaust openings 752, 752' may be disposed at an angle relative to a radial line extending from the center of rotation C. Exhaust openings 752, 752' disposed at an angle may facilitate the movement of the discharge arm 729 around the center of rotation C. Without being bounded by theory, the angle of the exhaust opening 752, 752' may facilitate dislodging contaminants 583.

It will be understood that combinations and substitutions of the various embodiments disclosed herein is considered to be within the scope of this disclosure. While this invention has been particularly shown and described with references to exemplary embodiments thereof, it will be understood by those skilled in the art that various changes in form and details may be made therein without departing from the scope of the invention encompassed by the appended claims.

What is claimed is:

1. A vapor relief strainer cleaning assembly comprising:
   a housing, wherein an inner wall of the housing defines a chamber;
   a filter screen disposed within the chamber, wherein the filter screen has an inner wall and an outer surface, and wherein the inner wall of the filter screen is configured to collect a fibrous non-condensable contaminant collected on the inner wall of the filter screen from vapor passing through the filter screen in a direction from the inner wall of the filter screen to the outer surface;
   a dislodger assembly disposed within the chamber, the dislodger assembly configured to clean at least a portion of the fibrous non-condensable contaminant collected on the inner wall of the filter screen, the dislodger assembly comprising:
      a shaft having a first axial end distally disposed from a second axial end;
      at least one dislodger support extending outwardly from the shaft, wherein the at least one dislodger support engages a dislodger, and wherein the dislodger is disposed adjacent to and in contact with the inner wall of the filter screen; and
      at least one discharge support extending outwardly from the shaft, wherein the at least one discharge support engages a discharge arm; and
   a lid assembly comprising:
      a turbine housing having walls, wherein the walls of the turbine housing define a turbine chamber, a turbine vapor inlet, a first turbine vapor outlet, and a second turbine vapor outlet, wherein the turbine chamber fluidly communicates with the turbine vapor inlet, the first turbine vapor outlet, and the second turbine vapor outlet; and a turbine comprising paddles extending outwardly from a turbine hub, wherein the turbine hub is a portion of the shaft extending into the turbine chamber, and wherein the turbine is configured to be disposed in the turbine housing, wherein the dislodger assembly is coupled to the shaft such that rotation of the turbine causes rotation of the dislodger assembly.

2. The vapor relief strainer cleaning assembly of claim 1, wherein the at least one discharge support is hollow, wherein the discharge arm is hollow, wherein the discharge arm has areas defining an exhaust opening, and wherein the at least one discharge support fluidly communicates with the discharge arm.

3. The vapor relief strainer cleaning assembly of claim 2, wherein the shaft is a hollow shaft having areas defining a shaft inlet upstream of the second axial end, wherein the second turbine vapor outlet is configured to fluidly communicate with the shaft inlet, and wherein the hollow shaft fluidly communicates with the at least one discharge support.

4. The vapor relief strainer cleaning assembly of claim 3, wherein the discharge arm further comprises areas defining multiple exhaust openings, wherein at least one exhaust opening of the multiple exhaust openings is disposed at an angle relative to a radial line extending from a center of rotation of the hollow shaft.

5. The vapor relief strainer cleaning assembly of claim 1 wherein the at least one discharge support comprises multiple discharge supports, wherein the multiple discharge supports are hollow.

6. The vapor relief strainer cleaning assembly of claim 5, wherein each multiple discharge support comprises a width, and wherein the width of each discharge support is greater than the width of an adjacent discharge support as a distance increases between the discharge support and a shaft inlet upstream of the second axial end.

7. The vapor relief strainer cleaning assembly of claim 1 wherein the at least one dislodger support comprises multiple dislodger supports, wherein a spring is disposed between at least one dislodger support of the multiple dislodge supports and the dislodger.

8. The vapor relief strainer cleaning assembly of claim 7 further comprising multiple springs, wherein a spring of the multiple springs is disposed between each of the multiple dislodger supports and the dislodger.

9. The vapor relief strainer cleaning assembly of claim 1, wherein the dislodger comprises multiple dislodgers and the at least one dislodger support comprises multiple sets of dislodger supports extending outwardly from the shaft, wherein each set of the multiple sets of dislodger supports engages at least one dislodger of the multiple dislodgers.

10. The vapor relief strainer cleaning assembly of claim 1, wherein the at least one discharge support comprises multiple discharge arms and multiple sets of discharge supports extending outwardly from the shaft, wherein each set of the multiple sets of discharge supports engages one of the multiple discharge arms.

11. The vapor relief strainer cleaning assembly of claim 1 further comprising:

a turbine vapor outlet conduit engaging the turbine housing and fluidly communicating with the first turbine vapor outlet, and a throttling valve disposed downstream of the turbine vapor outlet conduit and configured to fluidly communicate with the turbine vapor outlet conduit.

12. The vapor relief strainer cleaning assembly of claim 1, wherein the filter screen is disposed between the dislodger assembly and the inner wall of the housing.

13. The vapor relief strainer cleaning assembly of claim 1 further comprising an external conduit disposed along the at least one discharge support and the discharge arm, wherein the external conduit fluidly communicates with the turbine chamber and fluidly communicates with a housing outlet conduit through the filter screen.

14. The vapor relief strainer cleaning assembly of claim 1, wherein the dislodger is selected from a group consisting essentially of: a scraper, a brush, a rake, a sponge, a rag, a pipe cleaner, bristles, a device configured to physically contact and dislodge the fibrous non-condensable contaminant from the filter screen, and a device configured to use an intermediate medium to dislodge the fibrous non-condensable contaminant from the filter screen.

\* \* \* \* \*

UNITED STATES PATENT AND TRADEMARK OFFICE
CERTIFICATE OF CORRECTION

| | |
|---|---|
| PATENT NO. | : 11,083,985 B2 |
| APPLICATION NO. | : 15/874141 |
| DATED | : August 10, 2021 |
| INVENTOR(S) | : Walter E. Nellis |

It is certified that error appears in the above-identified patent and that said Letters Patent is hereby corrected as shown below:

In the Claims

In Column 14, Line 12, in Claim 9, after "one" delete "dislodger".

Signed and Sealed this
Twenty-seventh Day of June, 2023

Katherine Kelly Vidal
*Director of the United States Patent and Trademark Office*